United States Patent
Harada

(10) Patent No.: US 7,852,383 B2
(45) Date of Patent: Dec. 14, 2010

(54) IMAGE PICKUP APPARATUS

(75) Inventor: Osamu Harada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 915 days.

(21) Appl. No.: 11/669,075

(22) Filed: Jan. 30, 2007

(65) Prior Publication Data
US 2007/0177039 A1 Aug. 2, 2007

(30) Foreign Application Priority Data
Feb. 2, 2006 (JP) ............... 2006-026266

(51) Int. Cl.
*H04N 5/217* (2006.01)
*H04N 9/64* (2006.01)
(52) U.S. Cl. ............... 348/241; 348/246
(58) Field of Classification Search ........... 348/246, 348/247, 251, 231.6
See application file for complete search history.

(56) References Cited

U.S. PATENT DOCUMENTS 6,791,608 B1 9/2004 Miyazawa

| | | | |
|---|---|---|---|
| 2002/0093577 A1* | 7/2002 | Kitawaki et al. | 348/241 |
| 2002/0196354 A1* | 12/2002 | Chang et al. | 348/246 |
| 2006/0197854 A1* | 9/2006 | Kubo | 348/246 |
| 2007/0035643 A1* | 2/2007 | Hashimoto et al. | 348/246 |

FOREIGN PATENT DOCUMENTS

| | | |
|---|---|---|
| JP | 2000-312314 | 11/2000 |
| JP | 2002-300442 | 10/2002 |
| JP | 2003-298924 | 10/2003 |

* cited by examiner

*Primary Examiner*—Luong T Nguyen
(74) *Attorney, Agent, or Firm*—Canon USA Inc IP Div

(57) ABSTRACT

A detection error of foreign substance due to the presence of a newly generated defective pixel can be considerably prevented. An image pickup apparatus includes a foreign substance detector detecting foreign substance adhering to an optical member arranged on a light axis for image capturing in accordance with an image signal obtained by the image pickup device, a defective pixel position detector detecting a position of a defective pixel in the image pickup device in accordance with an image signal obtained by the image pickup device, a storage unit storing position information detected by the defective pixel position detector, and a controller controlling processing so that the foreign substance detector detects the foreign substance after the defective pixel position detector detects the position of the defective pixel.

6 Claims, 3 Drawing Sheets

IMAGE PICKUP APPARATUS

BACKGROUND OF THE INVENTION

1. Field of the Invention

The present invention relates to techniques for detecting foreign substance attached to an optical member arranged on a light axis for image capturing and arranged in front of an image pickup device using an image signal supplied from the image pickup device.

2. Description of the Related Art

In general, in a digital single-lens reflex camera having a replaceable lens, foreign substance on the camera such as foreign particles or dust moves because of replacement of lenses, driving of a mirror, and operation of a shutter. Accordingly, the foreign substance may adhere onto a cover glass disposed on a front surface of an image pickup device or a surface of an optical filter (such as a low-pass filter or an infrared cut filter) arranged on a light axis for image capturing. (The cover glass and the optical filter in addition to the image pickup device are collectively called an "image pickup unit" hereinafter.) When an image is captured using such an image pickup unit having a surface to which foreign substance is attached, the captured image is of low quality due to shadows cast by the foreign substance.

To address this sort of problem, a technique is known in which a foreign substance adhesion area on a light-receiving surface of an image pickup unit is detected so that an image in the detected area is interpolated, for example, using information on an image around the image in the detected area or so that a user is informed of the necessity to clean the light-receiving surface of the image pickup unit.

Japanese Patent Laid-Open No. 2000-312314 (corresponding to U.S. Pat. No. 6,791,608) discloses a technique in which a value of image information corresponding to each pixel in an image pickup device is compared with a predetermined value to detect the presence/absence of adhesion of foreign substance, and interpolation is performed for each of the pixels having the foreign substance using the image information on pixels surrounding the pixels having the foreign substance. In this case, positions of defective pixels in the image pickup device are stored in advance, and a value of image information corresponding to each of the defective pixels is not compared with the predetermined value. In this way, pixels having foreign substance are discriminated from defective pixels.

Furthermore, Japanese Patent Laid-Open No. 2003-298924 discloses a technique in which the total amount of light received in a pixel area including a plurality of pixels is obtained when an image pickup device receives predetermined uniform light, and further, an amount of light lost is obtained by comparing the total amount of light received with an amount of the light that should be received to determine whether or not the area includes foreign substance.

An image pickup device, such as a charge-coupled device (CCD) sensor or a complementary metal-oxide semiconductor (CMOS) sensor, included in a digital camera has a so-called white spot, which is a defective pixel having a considerable amount of dark current. The white spot causes deterioration of image performance. The defective pixel is compensated for by means of image information on non-defective pixels positioned around the defective pixel, resulting in improvement in the yield of an expensive image pickup device. Each of the positions of the defective pixel is mainly detected when a digital camera is fabricated, and position information on the detected position is stored in a storage device in the digital camera. In accordance with the position information on the defective pixel stored in the storage device, the defective pixel is compensated for every time an image is captured.

An image pickup device includes defective pixels generated when a digital camera is fabricated. In addition, the image pickup device may include defective pixels generated as time advances. In this case, since the defective pixels are newly generated after a user purchased a digital camera, position information on the newly generated defective pixels is not stored in the storage device.

In Japanese Patent Laid-Open No. 2000-312314, a value of image information corresponding to each of the defective pixels, position information on which is stored in the storage device in advance, is not compared with the predetermined value when the detection of pixels having foreign substance is attempted. However, a value of image information corresponding to each of the newly generated defective pixels is compared with the predetermined value. A determination as to whether or not foreign substance is attached to each of the pixels is performed in accordance with the comparison. Accordingly, even when foreign substance is attached to the newly generated defective pixels, a detection error may occur on the basis of the degree of defect.

In Japanese Patent Laid-Open No. 2003-298924, when an area to be subjected to integration includes a newly generated defective pixel, the integration value is greater than a value of image information in the defective pixel. Accordingly, depending on the degree of defect, an area including foreign substance may not be detected accurately.

Thus, an area having foreign substance is not detected accurately, and a shadow of the foreign substance is included in a captured image.

SUMMARY OF THE INVENTION

The present invention is directed to an image pickup apparatus which considerably prevents a detection error of foreign substance due to the presence of a newly generated defective pixel. According to a first aspect of the present invention, there is provided an image pickup apparatus having an image pickup device which outputs image signals subjected to photoelectric conversion including a foreign substance detector detecting foreign substance adhering to an optical member arranged on a light axis for image capturing and arranged in front of the image pickup device in accordance with the image signals outputted from the image pickup device, a defective pixel position detector detecting a position of a defective pixel in the image pickup device in accordance with the image signals outputted from the image pickup device, a storage unit storing information on the position detected by the defective pixel position detector, and a controller controlling the foreign substance detector to detect foreign substance after the defective pixel position detector detects the position of a defective pixel.

According to a second aspect of the present invention, there is provided a method for controlling an image pickup apparatus having an image pickup device which outputs image signals subjected to photoelectric conversion, including the steps of detecting foreign substance adhering to an optical member arranged on a light axis for image capturing and arranged in front of the image pickup device in accordance with the image signals outputted from the image pickup device, detecting a position of a defective pixel in the image pickup device in accordance with the image signals outputted from the image pickup device, storing information on the detected position, and controlling processing such that the foreign substance is detected after the position of a defective pixel is detected.

According to a third aspect of the present invention, there is provided a program which allows a computer to execute the above method.

According to the present invention, since foreign substance is detected after a position of a defective pixel is detected, a detection error of foreign substance due to the presence of a newly generated defective pixel is considerably prevented. Furthermore, when processing for detecting a foreign substance adhesion area is performed using an integration value of the area, the integration value is considerably prevented from being influenced by a newly generated defective pixel. Consequently, processing for detecting a foreign substance adhesion area is performed with high accuracy.

Further features of the present invention will become apparent from the following description of exemplary embodiments with reference to the attached drawings.

DESCRIPTION OF THE EMBODIMENTS

Embodiments of the present invention will now be described with reference to the accompanying drawings.

Figure 1:
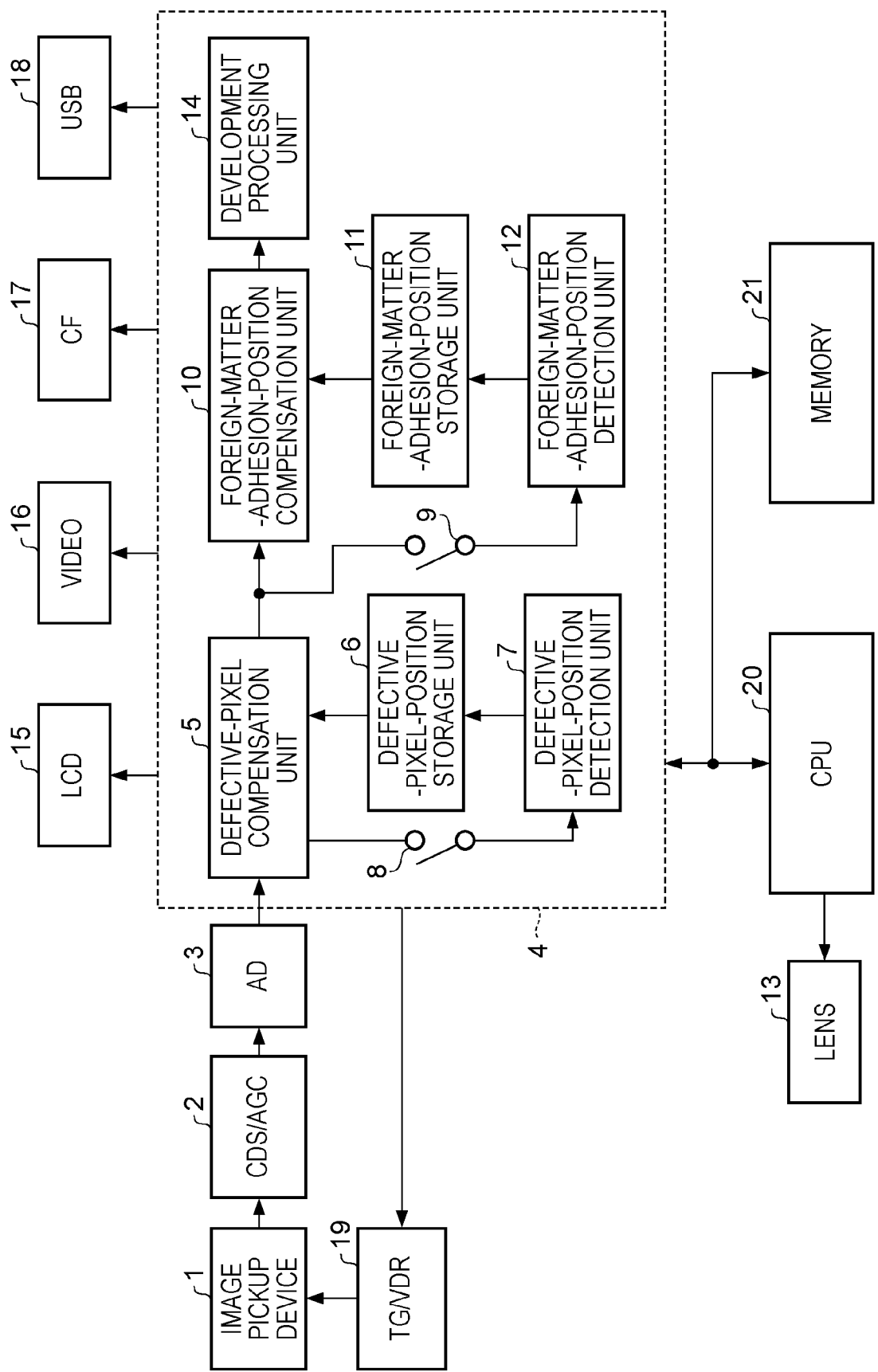
FIG. 1 is a block diagram showing a schematic configuration of a digital camera according to an embodiment of the present invention.

FIG. 1 is a block diagram of a digital camera in accordance with an embodiment of the present invention. The digital camera includes an image pickup device 1 having a plurality of photoelectric converters such as a CCD sensor or a CMOS sensor. An analog signal output from the image pickup device 1 is subjected to noise reduction and gain control in a collated double sampling/automatic gain control (CDS/AGC) circuit 2. Thereafter, the analog signal is converted into a digital signal in an analog/digital (A/D) converter 3 before being input into an engine 4, which is a digital signal processing IC.

The engine 4 includes a defective-pixel compensation unit 5, a defective-pixel-position storage unit 6, a defective-pixel-position detection unit 7, a foreign-substance-adhesion-position compensation unit 10, a foreign-substance-adhesion-position storage unit 11, a foreign-substance-adhesion-position detection unit 12, a development processing unit 14, and switches 8 and 9.

The defective-pixel compensation unit 5 performs interpolation processing for an image signal of a defective pixel output from the image pickup device 1 to the engine 4, for example, using image signals of pixels surrounding the defective pixel. Position information on the defective pixel is stored in the defective-pixel-position storage unit 6. The defective-pixel-position storage unit 6 stores position information on defective pixels newly generated on the basis of a detection result of the defective-pixel-position detection unit 7 in addition to position information on the defective pixels detected when the digital camera was fabricated.

The image signal corrected in the defective-pixel compensation unit 5 is input to the foreign-substance-adhesion-position compensation unit 10. The foreign-substance-adhesion-position compensation unit 10 performs interpolation processing for the image signal at a foreign-substance adhesion position, for example, using image signals at positions surrounding the foreign-substance adhesion position. Information on the foreign-substance adhesion position is stored in the foreign-substance-adhesion-position storage unit 11. The foreign-substance-adhesion-position storage unit 11 stores position information on the foreign-substance adhesion position on the basis of a detection result of the foreign-substance-adhesion-position detection unit 12.

The image signal corrected in the foreign-substance-adhesion-position compensation unit 10 is input to the development processing unit 14 to be subjected to development processing such as color interpolation processing before being stored in a memory 21. The developed image is displayed on a display (liquid crystal display (LCD)) 15 such as a thin-film transistor (TFT) liquid crystal display or an external monitor through a video terminal (VIDEO) 16.

Data of the developed image may be stored in an external storage 17 such as a compact flash (CF) card (a flash memory card). The developed image data may be output to an external computer through an interface 18 such as a universal serial bus (USB) interface, which is a serial communication device.

The engine 4 drives a timing generator (TG/VDR) 19 so that the timing generator 19 generates a clock signal to be supplied to the image pickup device 1.

A microprocessor (central processing unit (CPU)) 20 is connected to the engine 4 and issues commands for setting various settings for controlling the engine 4. The memory 21 is used as a workspace and an area for storing programs to be used by the CPU 20 and for temporarily storing data of captured images.

A lens 13 is an optical system for capturing images and has an actuator for controlling an aperture and a focus thereof. The actuator is controlled in accordance with an instruction supplied from the CPU 20.

Figure 3:
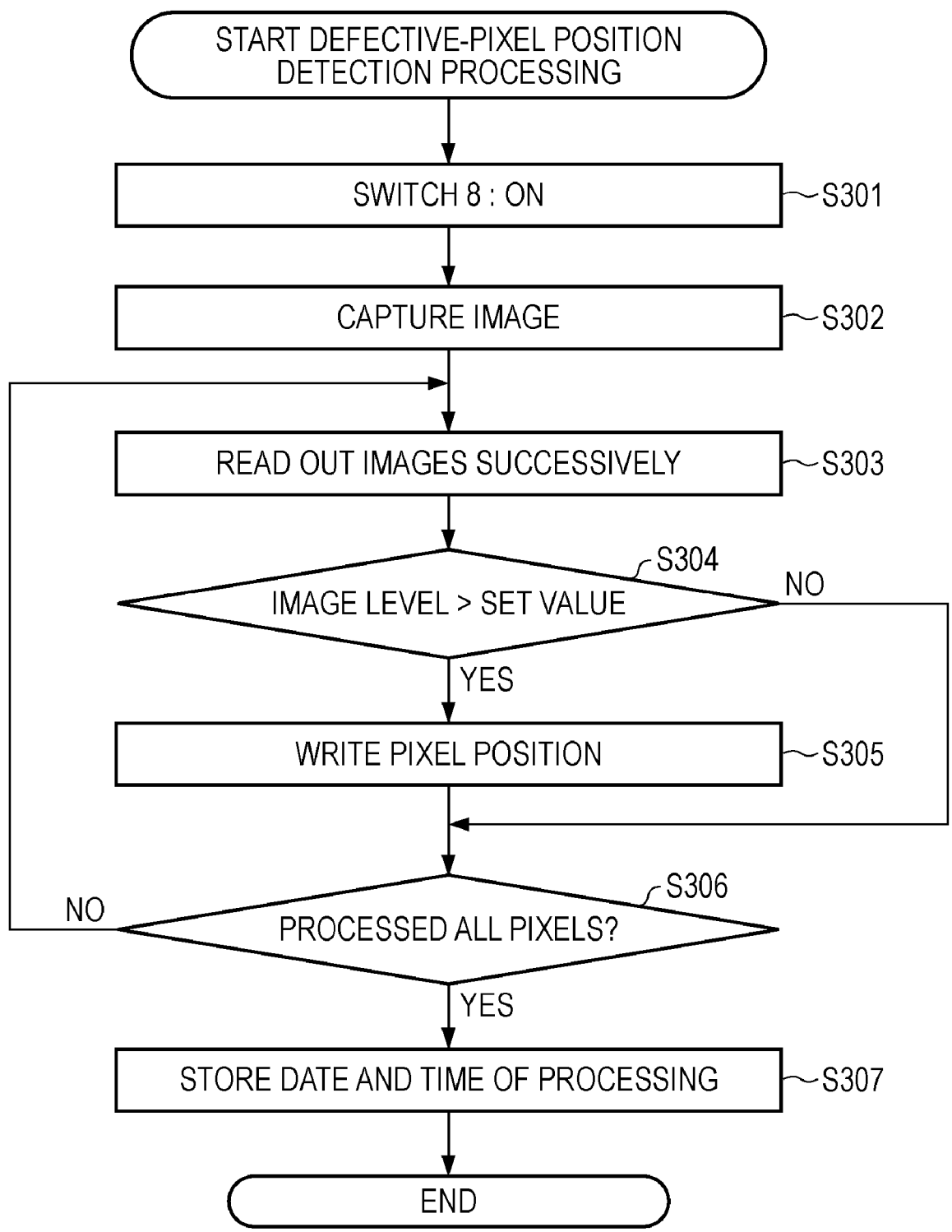
FIG. 3 is a flowchart illustrating processing for detecting a defective-pixel position according to the embodiment of the present invention.

Referring to a flowchart in FIG. 3, an example of processing for detecting a defective pixel position will now be described. When the CPU 20 issues an instruction for executing detection of a defective pixel position, the engine 4 turns the switch 8 on (step S301).

Then, an image is captured (step S302). When a white spot is intended to be detected, a dark image is captured. The image pickup device 1 outputs a signal to be supplied through the CDS/AGC circuit 2 and the A/D converter 3 to the engine 4.

The signal of the image input to the engine 4 is supplied to the defective-pixel compensation unit 5. The defective-pixel compensation unit 5 corrects the image signal of the defective pixel in accordance with position information currently stored in the defective-pixel-position storage unit 6. Then, the corrected image signal is supplied to the defective-pixel-position detection unit 7 (step S303). The images are read out successively.

Here, since the defective-pixel-position storage unit 6 does not store position information on newly generated defective pixels, image signals of the defective pixels are not corrected and supplied to the defective-pixel-position detection unit 7. The defective-pixel-position detection unit 7 compares a value of the input image signal for each pixel with a predetermined (set) value (step S304). As a result of the comparison, when the compared value of the image signal is larger than the predetermined value, the pixel corresponding to the image signal is determined to be a white spot and position information for the pixel is stored in the defective-pixel-position storage unit 6 (step S305). On the other hand, when the value of the image signal is not larger than the predetermined value, the pixel is determined to be normal and the processing in step S305 where the position information is stored in the defective-pixel-position storage unit 6 is omitted.

A determination as to whether or not all pixels have been subjected to the processing for detecting a defective pixel is made each time the detection processing for a pixel is terminated (step S306). Steps S303 to S306 are repeated until processing has been performed for all pixels.

When the detection processing is performed for all pixels, information indicating the date and time of execution of the detection processing is updated in the defective-pixel-position storage unit 6 (step S307). Note that although information on the date and time of execution of the detection processing is stored in the defective-pixel-position storage unit 6, the present invention is not limited to this. The information on the date and time of execution of the detection processing may be stored in another storage unit included in the digital camera.

The processing for detecting a defective pixel position can be executed arbitrarily by a user by means of an operation switch, which is not shown. Alternatively, the processing can be automatically executed by the digital camera itself at fixed intervals or before the digital camera performs a specific operation. The processing is repeated to detect positions of newly generated defective pixels. Thus, the position information stored in the defective-pixel-position storage unit 6 is updated and all defective pixels are compensated for.

Figure 2:
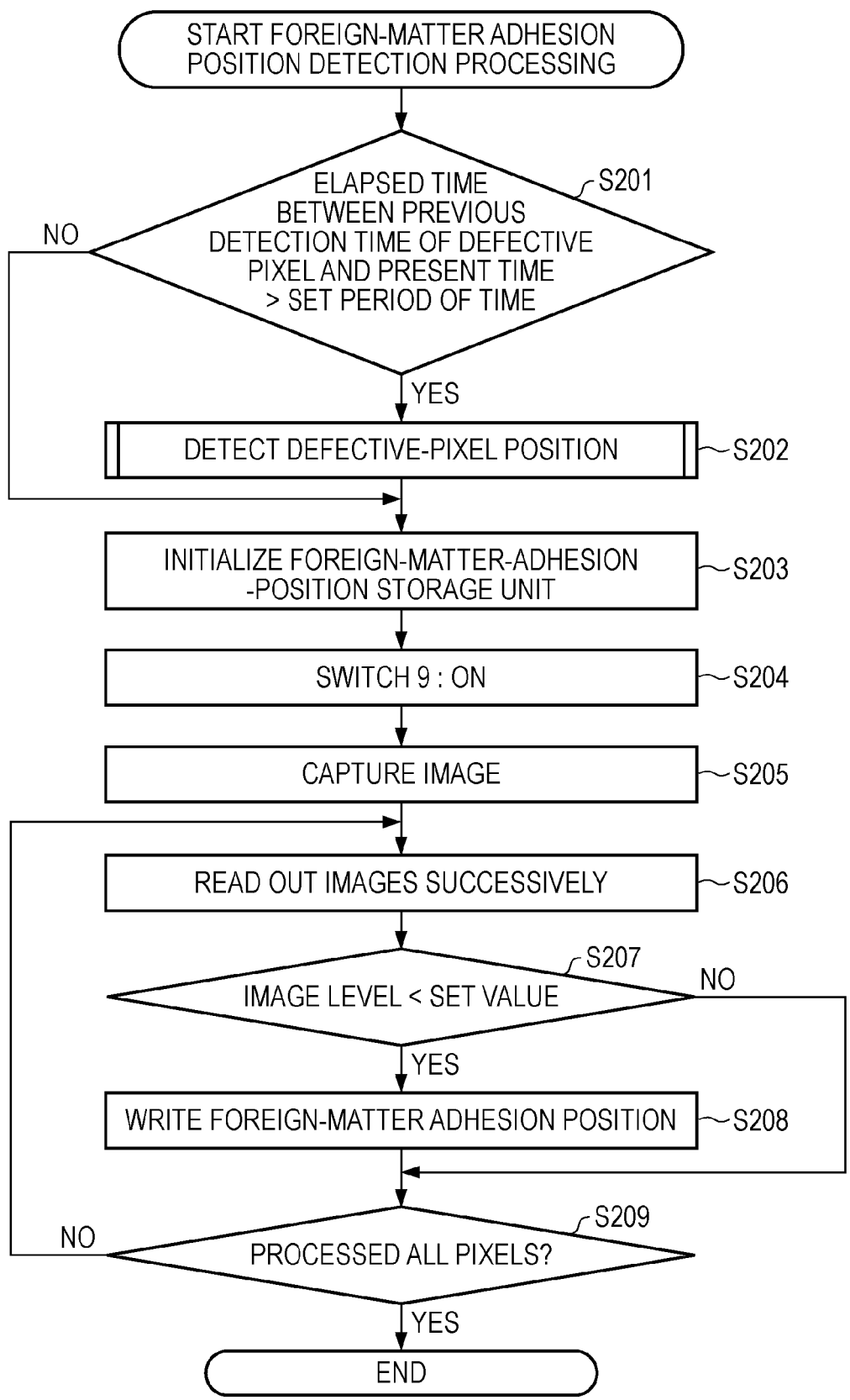
FIG. 2 is a flowchart illustrating processing for detecting a foreign-substance adhesion position according to the embodiment of the present invention.

Referring to a flowchart in FIG. 2, an example of processing for detecting a foreign-substance adhesion position will now be described. When the CPU 20 issues an instruction for executing detection of a foreign-substance adhesion position, information indicating the date and time when a defective pixel position was previously detected is read out from the defective-pixel-position storage unit 6 before the processing for detecting a foreign-substance adhesion position. Then, an elapsed time between the time of the date and time information and the present time is obtained to determine whether or not the processing for detecting a defective pixel position is to be performed (step S201).

When the elapsed time exceeds a predetermined (set) period of time in step S201, a defective pixel position is detected (step S202) and the processing proceeds to step S203. The processing for detecting a defective pixel position is the same as that detailed in the flowchart in FIG. 3, and the description thereof is omitted.

In a case where a user has arbitrarily executed the processing for detecting a defective pixel position within the predetermined period of time (that is, the elapsed time is not more than the predetermined period of time in step S201), a probability that a new defective pixel is generated after the previous performance of the processing for detecting a defective pixel position is extremely low. Accordingly, since performing the processing for detecting a defective pixel position again is a waste of time, the processing for detecting a defective pixel position is eliminated, and the processing proceeds to step S203.

Then, the engine 4 initializes contents of the foreign-substance-adhesion-position storage unit 11 (step S203), and turns the switch 9 on so that the image signal can be input to the foreign-substance-adhesion-position detection unit 12 (step S204). Here, the foreign-substance-adhesion-position storage unit 11 is initialized since foreign substance is movable and positions of the foreign substance may change for every detection. Accordingly, the contents of the foreign-substance-adhesion-position storage unit 11 is initialized rather than updated.

Then, an image is captured (step S205). Since shadow cast on a portion of the captured image correspond to a portion of the image pickup unit where foreign substance is attached, comparatively brighter light is used for capturing the image to easily detect the foreign substance. Light may be emitted from a dedicated light source in a digital camera or external light may be incident into the camera, as disclosed in Japanese Patent Laid-Open No. 2000-312314 and No. 2002-300442. Furthermore, when the image is captured, low ISO (International Organization of Standardization) sensitivity is set (e.g. ISO100), or the lowest ISO sensitivity is set (e.g. ISO50), since low ISO sensitivity can considerably prevent an image pickup device from being influenced by random noise.

When an image is captured under uniform light, an image signal output from the image pickup device 1 is supplied through the CDS/AGC circuit 2 and the A/D converter 3 to the engine 4. The image signal input to the engine 4 is supplied to the defective-pixel compensation unit 5. The defective-pixel compensation unit 5 corrects the image signal of the defective pixel in accordance with position information updated in step S202 in the defective-pixel-position storage unit 6. Then, the corrected image signal is supplied (successively read out) to the foreign-substance-adhesion-position detection unit 12 (step S206).

In the foreign-substance-adhesion-position detection unit 12, a value of the input image signal corresponding to a pixel is compared with a predetermined (set) value (step S207). When the value of the image signal is smaller than the predetermined value, it is determined that a foreign particle is adhered to the pixel and position information is written into the foreign-substance-adhesion-position storage unit 11 (step S208). On the other hand, when the value of the image signal is not smaller than the predetermined value, it is determined that foreign substance is not adhered to the pixel, and processing of step S208 where position information is written into the foreign-substance-adhesion-position storage unit 11 is omitted.

A determination as to whether or not all pixels have been subjected to the processing for detecting a foreign-substance adhesion position is made each time the detection processing for a pixel is terminated (step S209). Steps S206 to S209 are repeated until the processing has been performed for all pixels.

As with the processing for detecting a defective pixel position, the processing for detecting a foreign-substance adhesion position can be executed arbitrarily by a user by means of an operation switch, which is not shown. Alternatively, the processing can be automatically executed by the digital camera itself at fixed intervals or before the digital camera performs a specific operation.

Although the engine 4 includes the foreign-substance-adhesion-position compensation unit 10 in this embodiment, the engine 4 does not necessarily include the foreign-substance-adhesion-position compensation unit 10. For example, when foreign substance is detected on a light-receiving surface of an image pickup unit, the user may be informed of the necessity to clean the light-receiving surface of the image pickup unit through the LCD 15.

In this embodiment, the processing for detecting a foreign-substance adhesion position is performed for each pixel, and a result of the detection is stored in the foreign-substance-adhesion-position storage unit 11. However, a detection method and a storing method are not limited to them. For example, as disclosed in Japanese Patent Laid-Open No. 2003-298924, an integration value for a specific area may be obtained and compared with a reference value so that a foreign substance adhesion area is detected. Thereafter, information related to the area detected on the basis of the detection result may be stored in the foreign-substance-adhesion-position storage unit 11.

In this embodiment, in the processing for detecting a foreign-substance adhesion position, a determination (step S201) as to whether or not the processing for detecting a defective pixel position is to be performed is made in accordance with the elapsed time between the time of the date and time information when processing for detecting a defective pixel position was previously performed and the present time. However, the present invention is not limited to this. For example, the total number of times images have been captured at the present time and the total number of times images had been captured at the time of previous performance of processing for detecting a defective pixel position by a digital camera are stored in the digital camera. The number of times images have been captured after the previous performance of processing for detecting a defective pixel position is obtained on the basis of the stored information, and is set as a reference value for the determination. (For example, when the reference value exceeds a predetermined number of times images have been captured, processing for detecting a defective pixel position is performed (step S202)).

As described above, since processing for detecting a position of a defective pixel is performed before processing for detecting a position of foreign substance, a detection error of foreign substance due to the presence of a newly generated defective pixel is considerably prevented. When processing for detecting a foreign substance adhesion area is performed using an integration value of the area, the integration value is considerably prevented from being influenced by a newly generated defective pixel. Consequently, processing for detecting a foreign substance adhesion area is performed with high accuracy.

An aspect of the present invention can be attained by supplying a storage medium storing a program code of software implementing the above-described functions of the embodiments to a system or an apparatus so that a computer (or CPU or a microprocessing unit (MPU)) in the system or the apparatus reads out and executes the program code stored in the storage medium.

In this case, the program code read out from the storage medium implements the above-described functions of the embodiments. Accordingly, the present invention includes the program code and the storage medium storing the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2006-026266 filed Feb. 2, 2006, which is hereby incorporated by reference herein in its entirety.

What is claimed is:

1. An image pickup apparatus having an image pickup device which outputs image signals subjected to photoelectric conversion, the image pickup apparatus comprising:
    a defective pixel position detector detecting a position of a defective pixel in the image pickup device in accordance with the image signals outputted from the image pickup device;
    a storage unit storing position information on the position detected by the defective pixel position detector;
    a defective pixel compensator correcting the image signals corresponding to the position of the defective pixel in accordance with the position information stored in the storage unit;
    an optical member arranged on a light axis for image capturing and arranged in front of the image pickup device;
    a foreign substance detector detecting foreign substance adhering to the optical member in accordance with the image signals outputted from the defective pixel compensator; and
    a controller controlling the defective pixel position detector, the storage unit, the defective pixel compensator, and the foreign substance detector, so that for the foreign substance detector to perform detection, firstly the defective pixel position detector performs detection to update the position information stored in the storage unit, then based on the updated position information, the defective pixel compensator performs correction, and thereafter, the foreign substance detector performs the detection.

2. The image pickup apparatus according to claim 1, wherein the controller determines whether or not the defective pixel position detector detected the position of the defective pixel within a predetermined period of time before the detection performed by the foreign substance detector, and responsive to the controller determining that the defective pixel position detector performed detection of the position of the defective pixel within the predetermined period of time, the defective pixel position detector does not further perform the detection of the position of the defective pixel.

3. The image pickup apparatus according to claim 1, wherein a lowest ISO sensitivity is set responsive to an image being captured in the detection of the foreign substance by the foreign substance detector.

4. The image pickup apparatus according to claim 2, wherein a lowest ISO sensitivity is set responsive to an image being captured in the detection of the foreign substance by the foreign substance detector.

5. A method for controlling an image pickup apparatus having an image pickup device which outputs image signals subjected to photoelectric conversion, an optical member arranged on a light axis for image capturing and arranged in front of the image pickup device, and a foreign substance detector detecting foreign substance adhering to the optical member, the controlling method for the image pickup apparatus to perform detection by the foreign substance detector comprising:
    a detecting step for detecting a position of a defective pixel in the image pickup device in accordance with the image signals outputted from the image pickup device;
    a storing step for storing position information on the detected position in a storage unit;
    a defective pixel correcting step for correcting the image signals corresponding to the position of the defective pixel in accordance with the position information stored in the storage unit;
    a detecting step for detecting the foreign substance adhering to the optical member in accordance with the corrected image signals corresponding to the position of the defective pixel.

6. A program stored on a non-transitory recording medium and which allows a computer to execute the method set forth in claim 5.

* * * * *